(12) United States Patent
Krivopaltsev et al.

(10) Patent No.: US 9,400,660 B1
(45) Date of Patent: Jul. 26, 2016

(54) CUSTOMIZING USER INTERFACES OF NATIVE APPLICATIONS FOR PORTABLE ELECTRONIC DEVICES

(71) Applicant: INTUIT INC., Mountain View, CA (US)

(72) Inventors: Eugene Krivopaltsev, San Jose, CA (US); Desiree D. G. Gosby, San Francisco, CA (US); Cheryl Ainoa, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 523 days.

(21) Appl. No.: 13/796,329

(22) Filed: Mar. 12, 2013

(51) Int. Cl.
*G06F 3/0481* (2013.01)
*G06F 9/44* (2006.01)

(52) U.S. Cl.
CPC .................................. *G06F 9/4443* (2013.01)

(58) Field of Classification Search
CPC ......... G06F 3/00; G06F 3/048; G06F 3/0481; G06F 17/212; G06F 9/4443; G06F 9/44543; G06F 3/0482; G06F 3/0484; H04L 29/06
See application file for complete search history.

(56) References Cited

U.S. PATENT DOCUMENTS

| | | | |
|---|---|---|---|
| 6,456,308 B1* | 9/2002 | Agranat | G06F 8/20 707/E17.118 |
| 7,506,259 B1* | 3/2009 | Narayanaswami et al. | 715/734 |
| 8,898,629 B2* | 11/2014 | Hirsch et al. | 717/107 |
| 8,898,630 B2* | 11/2014 | Hirsch et al. | 717/107 |
| 2003/0063120 A1* | 4/2003 | Wong et al. | 345/746 |
| 2006/0089147 A1* | 4/2006 | Beaty | 455/445 |
| 2007/0150816 A1* | 6/2007 | Hariki | 715/733 |
| 2009/0327922 A1* | 12/2009 | Van Ness et al. | 715/760 |
| 2012/0159308 A1* | 6/2012 | Tseng | G06F 9/4443 715/234 |
| 2013/0080887 A1* | 3/2013 | Hou | G06F 9/455 715/273 |
| 2013/0093764 A1* | 4/2013 | Andersson et al. | 345/419 |
| 2013/0174047 A1* | 7/2013 | Sivakumar et al. | 715/746 |
| 2013/0317919 A1* | 11/2013 | Raman et al. | 705/14.73 |

* cited by examiner

*Primary Examiner* — Xiomar L Bautista
(74) *Attorney, Agent, or Firm* — Patterson & Sheridan, LLP

(57) ABSTRACT

The disclosed embodiments provide a system that facilitates use of a native application for a portable electronic device. During operation, the system obtains one or more custom views for a user interface of the native application. The one or more custom views may include a set of user-interface components, a layout of the user-interface components, and/or a configuration of a user-interface component from the set of user-interface components. Next, the system enables use of the one or more custom views with the native application independently of a platform of the native application.

21 Claims, 7 Drawing Sheets

CUSTOMIZING USER INTERFACES OF NATIVE APPLICATIONS FOR PORTABLE ELECTRONIC DEVICES

BACKGROUND

Related Art

The disclosed embodiments relate to user interfaces for portable electronic devices. More specifically, the disclosed embodiments relate to techniques for customizing user interfaces of native applications for portable electronic devices.

A user typically interacts with an electronic device, such as a personal computer, laptop computer, tablet computer, mobile phone, digital media receiver, and/or portable media player, by providing input to and receiving output from the electronic device through various input and output mechanisms. For example, the user may enter input into a laptop computer using a keyboard, mouse, and/or touchpad and receive output from the laptop computer via a display screen and/or speakers.

Applications on the electronic device may provide user interfaces (UIs) that facilitate interaction between the user and the electronic device. In addition, the UIs may be tailored to the input/output (I/O) devices and/or form factor of the electronic device. For example, a graphical user interface (GUI) of an application on a tablet computer may provide UI components such as windows, menus, icons, checkboxes, text boxes, and/or radio buttons. These UI components may be displayed to the user through a touchscreen of the tablet computer. In turn, the touchscreen may allow the user to manipulate the UI components using gestures such as swiping, zooming, and/or tapping. Because the tablet computer may lack a physical keyboard, the touchscreen may also provide a virtual keyboard that allows the user to enter alphanumeric input into the tablet computer.

Usability is an important consideration in designing user interfaces. In particular, usability considerations may include: the efficiency with which tasks are accomplished through the UI; the user's ability to learn and master the operation of the UI; and/or the availability of feedback, help, documentation, and/or status information within the UI. For example, the user may accomplish tasks more easily and quickly if UI elements are arranged and displayed in a meaningful way within the UI. Consequently, user satisfaction with an application on an electronic device may be highly influenced by characteristics of the user interface provided by the application and/or the user's ability to interact with the user interface through I/O devices of the electronic device.

SUMMARY

The disclosed embodiments provide a system that facilitates use of a native application for a portable electronic device. During operation, the system obtains one or more custom views for a user interface of the native application. The one or more custom views may include a set of user-interface components, a layout of the user-interface components, and/or a configuration of a user-interface component from the set of user-interface components. Next, the system enables use of the one or more custom views with the native application independently of a platform of the native application.

In some embodiments, obtaining the one or more custom views for the user interface involves at least one of enabling creation of the one or more custom views by a user, and selecting the one or more custom views for use with the native application based on a use case of the native application.

In some embodiments, enabling creation of the one or more custom views by the user involves at least one of:
 (i) providing a set of layouts to the user;
 (ii) obtaining, from the user, a selection of the layout from the set of layouts for use in a custom view;
 (iii) enabling placement of one or more of the user-interface components within the layout;
 (iv) enabling reallocation of space within the layout to the one or more of the user-interface components;
 (v) obtaining the configuration of the user-interface component from the user; and
 (vi) storing the custom view for subsequent use with the native application.

In some embodiments, the custom view is stored in at least one of the portable electronic device and a remote storage system.

In some embodiments, the set of layouts is associated with a type of the portable electronic device. For example, the set of layouts may be tailored to the form factor, orientation (e.g., portrait, landscape, etc.), and/or dimensions of the portable electronic device.

In some embodiments, enabling use of the one or more custom views with the native application involves at least one of:
 (i) displaying the one or more custom views within the user interface;
 (ii) providing a list of the one or more custom views; and
 (iii) enabling management of the one or more custom views.

In some embodiments, management of the one or more custom views is associated with at least one of:
 (i) creation of a new custom view;
 (ii) modification of an existing custom view;
 (iii) deletion of the existing custom view; and
 (iv) reordering of the list.

In some embodiments, the configuration of the user-interface component includes at least one of a title, a category, a range, a tag, a value, and a display setting.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
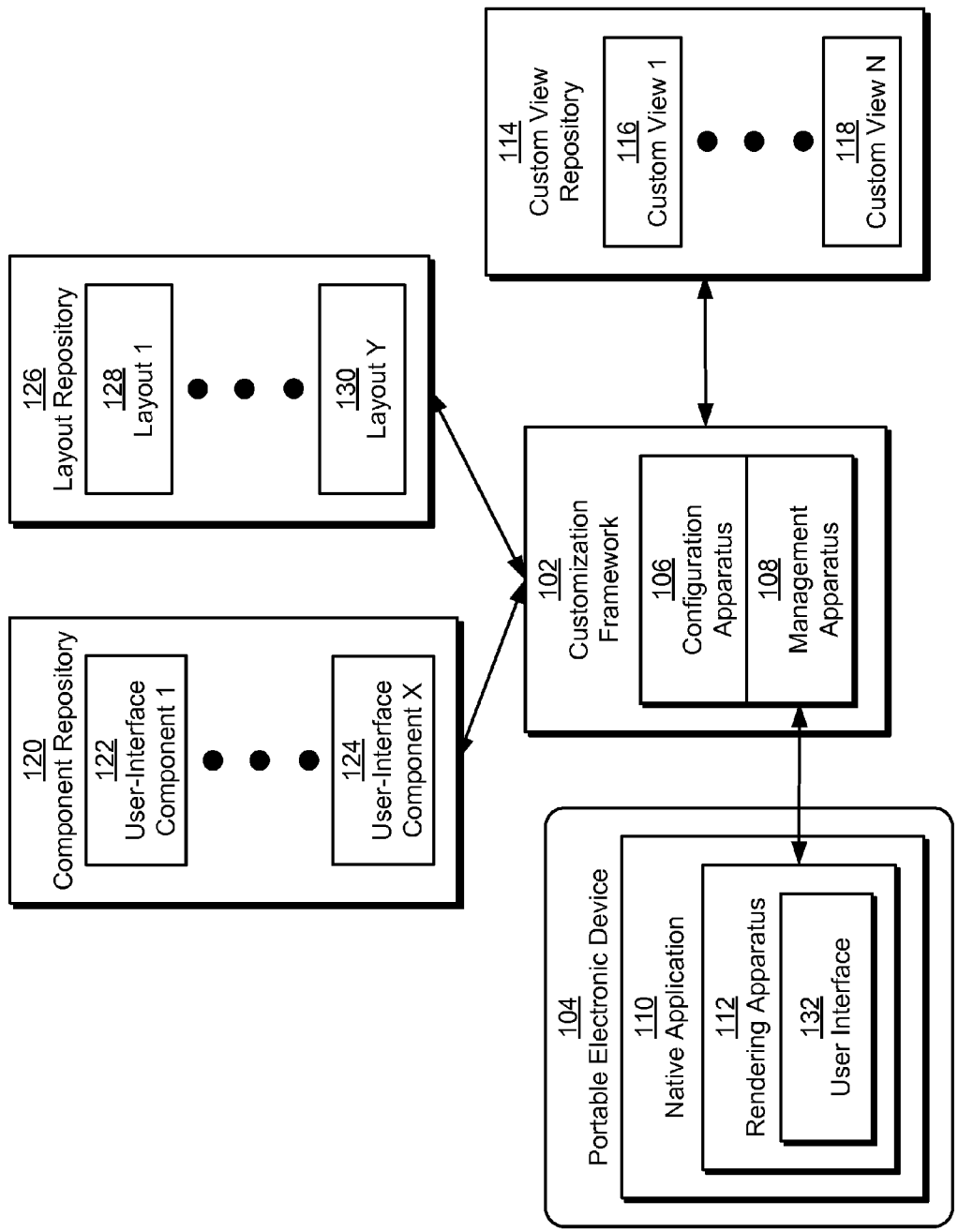
FIG. 1 shows a schematic of a system in accordance with the disclosed embodiments.

The disclosed embodiments provide a method and system for facilitating use of a native application for a portable electronic device. As shown in FIG. 1, a native application 110 may reside on a portable electronic device 104 such as a mobile phone, tablet computer, personal digital assistant, and/or portable media player. For example, native application 110 may be downloaded from an application distribution system and/or content provider and installed locally on portable electronic device 104. As a result, the implementation of native application 110 may be based on the platform (e.g., operating system, hardware, etc.) of portable electronic device 104.

Native application 110 may then be used to perform a set of tasks for a user of portable electronic device 104. For example, native application 110 may allow the user to browse websites, send and receive emails, access and/or organize digital media, play a game, use mapping and/or navigation services, and/or manage personal finances on portable electronic device 104.

During use of native application 110, portable electronic device 104 may use a network connection to obtain data associated with native application 110 from a server and transmit updates to the data to the server. For example, portable electronic device 104 may use a wireless and/or cellular network to send and receive emails, financial information, digital media, game play information, and/or other data used by native application 110 with the server. As a result, native application 110 may execute using a client-server model.

In addition, interaction between the user and native application 110 may be enabled by a user interface 132. For example, user interface 132 may be a graphical user interface (GUI) that displays text, images, documents, menus, icons, thumbnails, form fields, data, and/or other user-interface elements to the user. The GUI may also accept user input (e.g., gestures, keyboard presses, etc.) that is used to manipulate and/or update the elements. In other words, user interface 132 may be a mechanism for providing and/or formatting data and/or features associated with native application 110 for use on portable electronic device 104.

However, the arrangement of screens and/or user-interface elements within the screens in user interface 132 may be hard-coded into native application 110. For example, a developer of native application 110 may create user interface 132 by making method calls to an application-programming interface (API) associated with the platform of portable electronic device 104 within source code for native application 110. In turn, changes to user interface 132 may require the installation of a new version of native application 110 and/or an update to native application 110 on portable electronic device 104. The new version and/or update may additionally require approval by the application distribution system and/or content provider before the new version and/or update is released, thus delaying propagation of the changes to portable electronic device 104. In other words, changes and/or customizations to user interface 132 may lead to the proliferation of different versions of native application 110 and increase the complexity associated with managing and/or releasing native application 110.

The static nature of user interface 132 may also limit the user's ability to customize user interface 132 to his/her preferences. For example, the user may not be able to change the layout, content, and/or configuration of user-interface elements within a screen of user interface 132. As a result, the user may find interaction with native application 110 to be confusing, inefficient, and/or limited, which may negatively impact the user's experience with native application 110.

In one or more embodiments, the system of FIG. 1 includes functionality to enable customization of user interface 132 independently of the platform and/or implementation of native application 110. Such customization may be performed by the user of portable electronic device 104 and/or another user associated with native application 110. For example, the user of portable electronic device 104 may customize user interface 132 to tailor the order and/or arrangement of features and/or data within user interface 132 to the user's preferences and/or needs. Conversely, user interface 132 may be customized by a developer of native application 110 to provide different variations of user interface 132 for different use cases (e.g., types of users, types of native application 110, platform, type and/or form factor of portable electronic device 104, etc.) of native application 110.

In particular, a customization framework 102 for user interface 132 may enable the creation of a set of custom views (e.g., custom view 1 116, custom view n 118) for user interface 132, as well as the subsequent use of the custom views with native application 110. Each custom view may represent a custom layout, arrangement, and/or configuration of data and/or features in native application 110 within a screen of user interface 132.

During creation of a custom view, a configuration apparatus 106 in customization framework 102 may obtain a set of layouts (e.g., layout 1 128, layout y 130) for the custom view from a layout repository 126 and a set of user-interface components (e.g., user-interface component 1 122, user-interface component x 124) for native application 110 from a component repository 120. The layouts may correspond to screen layouts for user interface 132, while the user-interface components may represent features of native application 110 that may be placed into predefined regions within the layouts.

Because native application 110 may be used with different types and/or sizes of portable electronic devices, configuration apparatus 106 may obtain layouts that are suitable for use with the type (e.g., form factor, dimensions, etc.) of portable electronic device 104. For example, configuration apparatus 106 may obtain layouts with fewer and/or smaller regions for use with a mobile phone and layouts with more and/or larger regions for use with a tablet computer. On the other hand, the user-interface components may provide functionality associated with native application 110. As a result, configuration apparatus 106 may obtain user-interface components that are defined for use with native application 110 and/or a specific use case of native application 110 by a developer of native application 110. For example, configuration apparatus 106 may obtain the user-interface components from a particular implementation and/or definition of native application 110.

Configuration apparatus 106 may also provide a set of tools for creating the custom view from the layouts and user-interface components. First, configuration apparatus 106 may provide the layouts to the user creating the custom view (e.g., the user of portable electronic device 104, a developer of native application 110, etc.) and obtain a selection of one of the layouts for use in the custom view. After the user selects a layout for use in the custom view, configuration apparatus 106 may enable placement of one or more of the user-interface components within the layout and/or reallocation of space within the layout to the placed user-interface components. For example, configuration apparatus 106 may allow the user to drag a user-interface component to each predefined region in the layout. Configuration apparatus 106 may also provide a "ruler" tool that allows the user to resize the regions in the layout so that the user-interface components in the regions occupy more or less of the available space in the custom view.

Once a user-interface component is placed into a predefined region in the layout, configuration apparatus 106 may obtain a configuration of the user-interface component from the user. The configuration may include parameters that affect the behavior and/or appearance of the user-interface component. For example, the configuration may include a category, a range, (e.g., date range, value range, etc.), a tag (e.g., user-defined tag), a value, and/or a display setting (e.g., color, font, size, etc.) associated with display of data and/or user-interface elements (e.g., menus, buttons, checkboxes, etc.) within the user-interface component. If the user does not wish to configure the user-interface component, a set of default configuration parameters may be obtained from component repository 120 and/or another source and used to configure the user-interface component. Creation of custom views for native applications in portable electronic devices is discussed in further detail below with respect to FIGS. 2A-2B.

After the user is finished creating the custom view, configuration apparatus 106 may store the custom view in a custom view repository 114 for subsequent use with native application 110. In addition, custom view repository 114 may be located in a variety of locations to facilitate access to the custom view by one or more users of native application 110. For example, configuration apparatus 106 may store the custom view in a local custom view repository on portable electronic device 104 if the custom view is created by the user of portable electronic device 104. On the other hand, configuration apparatus 106 may store the custom view in a remote custom view repository (e.g., server, cloud storage, etc.) if the custom view is created by a developer of native application 110 to enable access to the custom view from multiple users of native application 110 across multiple portable electronic devices.

A management apparatus 108 in customization framework 102 may then enable use of the custom views with native application 110 independently of the platform (e.g., operating system) of native application 110. More specifically, management apparatus 108 may provide the custom views to a rendering apparatus 112 in native application 110, and rendering apparatus 112 may display the custom views within user interface 132. For example, management apparatus 108 may obtain a custom view from custom view repository 114 as structured data specifying the layout of the custom view, user-interface components within the layout, configurations of the user-interface components, and/or the sizes of regions containing the user-interface components in the layout. Rendering apparatus 112 may use the structured data to assemble user-interface components within user interface 132 and pass configurations of the user-interface components to native application 110 for processing and update of the user-interface components.

Management apparatus 108 may also enable management of the custom views. For example, management apparatus 108 and/or rendering apparatus 112 may display a list of the custom views and allow reordering of the list, so that the custom views may be accessed in a different order within user interface 132. Management apparatus 108 may also provide mechanisms for creating new custom views and/or deleting existing custom views. Management of custom views for native applications in portable electronic devices is discussed in further detail below with respect to FIG. 2C.

Consequently, customization framework 102 may allow changes to user interface 132 to be made and used with different portable electronic devices without modifying native application 110. In particular, the use of structured data in defining the custom views may decouple the platform-specific implementation of features by native application 110 from the arrangement and/or configuration of user-interface components associated with the features within user interface 132. In turn, the custom views may be used by the user of portable electronic device 104 to customize his/her experience with native application 110 and/or by a developer to tailor native application 110 to different types of users and/or use cases without implementing a new native application for each user, type of user, and/or use case.

Those skilled in the art will appreciate that the system of FIG. 1 may be implemented in a variety of ways. First, configuration apparatus 106, management apparatus 108, component repository 120, layout repository 126, and/or custom view repository 114 may be provided by a single physical machine, multiple computer systems, a grid, one or more databases, one or more filesystems, and/or a cloud computing system. In addition, configuration apparatus 106 and management apparatus 108 may be provided by the same hardware and/or software component, or configuration apparatus 106 and management apparatus 108 may execute independently from one another. For example, configuration apparatus 106 and management apparatus 108 may reside on portable electronic device 104 along with rendering apparatus 112, or configuration apparatus 106 and/or management apparatus 108 may execute on a server that is capable of communicating with portable electronic device 104 and providing custom views for native application 110 to portable electronic device 104.

Second, user-interface components, layouts, and/or custom views for native application 110 may be defined using a number of techniques. For example, customization framework 102 may obtain, store, and/or provide the layouts and/or custom views as property lists, Extensible Markup language (XML) documents, JavaScript Object Notation (JSON) objects, and/or other types of structured, platform-agnostic data. Customization framework 102 may also obtain parameters associated with configurations for user-interface components from interfaces for the user-interface components and/or definitions of the user-interface components provided by developers of native application 110.

Figure 2A:
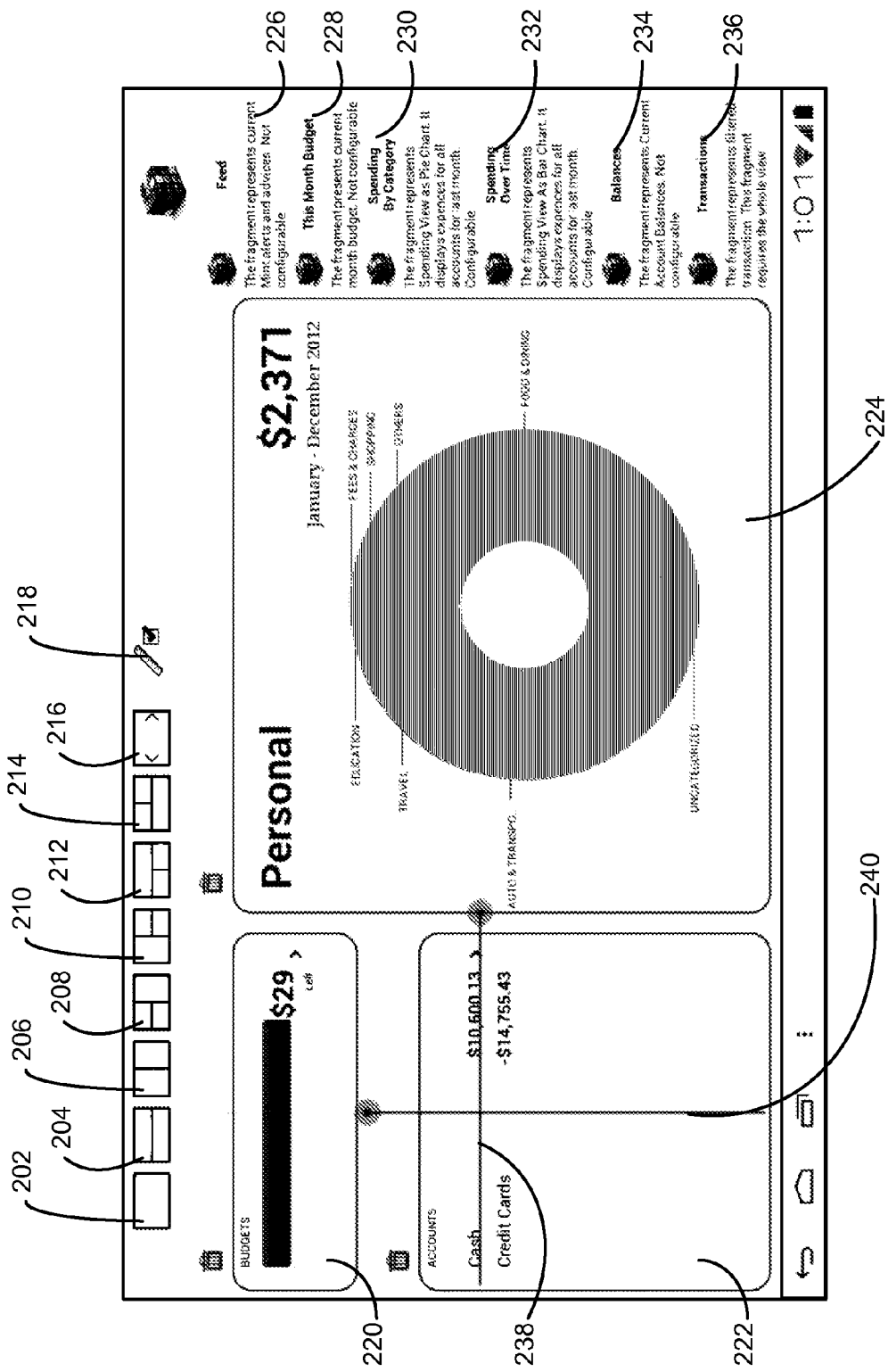
FIG. 2A shows an exemplary screenshot in accordance with the disclosed embodiments.

FIG. 2A shows an exemplary screenshot in accordance with the disclosed embodiments. More specifically, FIG. 2A shows a screenshot of a user interface for creating a custom view for a native application, such as native application 110 of FIG. 1. The user interface may be provided by a configuration apparatus of a customization framework for the native application, such as configuration apparatus 106 of FIG. 1.

The user interface may provide a set of layouts 202-216 for the custom view to a user, such as a user and/or developer of the native application. The user may select a layout (e.g., layout 208) for use in the custom view by tapping, clicking, and/or otherwise selecting the layout within the user interface. As mentioned above, layouts 202-216 may be associated with the type of portable electronic device on which the native application is to execute. For example, layouts 202-216 may be tailored to the dimensions, form factor, orientation (e.g., portrait, landscape, etc.), and/or I/O devices of a tablet computer.

The selected layout may then be displayed as a set of regions 220-224 within the user interface. In addition, the user interface may enable the placement of one or more user-interface components 226-236 from the native application within regions 220-224. For example, the user may place a different user-interface component 226-236 into each region 220-224 by dragging the user-interface component from the right side of the user interface to the region.

The user may also reallocate space within the layout to the user-interface components in regions 220-224. For example, the user may select a ruler tool 218 to activate a set of rulers 238-240 for resizing regions 220-224 within the custom view. The user may then perform such resizing by dragging rulers 238-240 horizontally or vertically across the user interface and/or performing a pinching gesture on the portable electronic device.

Figure 2B:
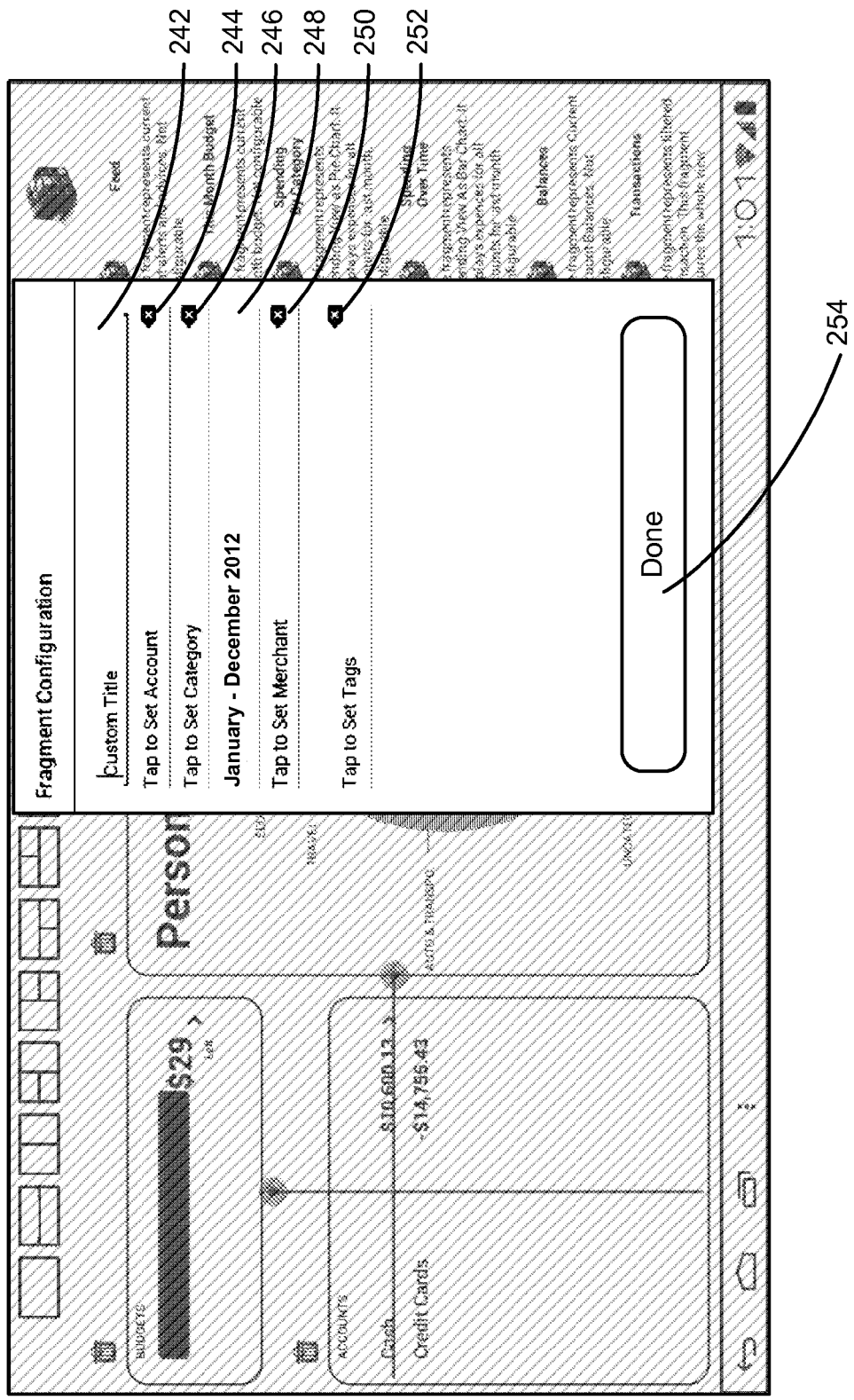
FIG. 2B shows an exemplary screenshot in accordance with the disclosed embodiments.

After a user-interface component is placed into a region, the user may provide a configuration of the user-interface component. As shown in FIG. 2B, the user may activate a sub-screen of the user interface of FIG. 2A for configuring the user-interface component. For example, the user may access the sub-screen of FIG. 2B by tapping and holding, double clicking, and/or performing another action within the region containing the user-interface component. The sub-screen for configuring the user-interface component may then be overlaid on the screen for creating the custom view.

Within the sub-screen, the user may set and/or modify a number of parameters 242-252 associated with the configuration by tapping and/or otherwise selecting regions of the sub-screen containing parameters 242-252. For example, the user may use the sub-screen to set parameters 242-252 associated with display of financial data by the user-interface component. First, the user may set a parameter 242 (e.g., "Custom Title") for a title of the configuration and/or user-interface component. Next, the user may select values for a parameter 244 representing an account (e.g., "Tap to Set Account"), a parameter 246 representing a category (e.g., "Tap to Set Category"), and/or a parameter 250 representing a merchant (e.g., "Tap to Set Merchant") associated with the financial data. The user may also specify a range for a parameter 248 (e.g., "January-December 2012") representing a set of dates associated with the financial data. Finally, the user may provide one or more values for a parameter 252 representing tags (e.g., "Tap to Set Tags") associated with the user-interface component and/or financial data.

Once values for parameters 242-252 are obtained from the user, the values may be used to configure the user-interface component. For example, the user may tap and/or select a button 254 to submit values for parameters 242-252 to the user interface. The values may then be used by the native application to display and/or configure financial data associated with a specific account, category, merchant, and/or date range within the user-interface component.

The sub-screen and/or another sub-screen of the user interface may additionally obtain other values for parameters (not shown) related to display settings for the user-interface component. For example, the sub-screen(s) may obtain a display color, font, font size, user-interface element (e.g., menu, checkbox, button, etc.), and/or other display option associated with the user-interface component from the user and use the display option(s) to adjust the display of data, features, and/or user-interface elements within the user-interface component.

Figure 2C:
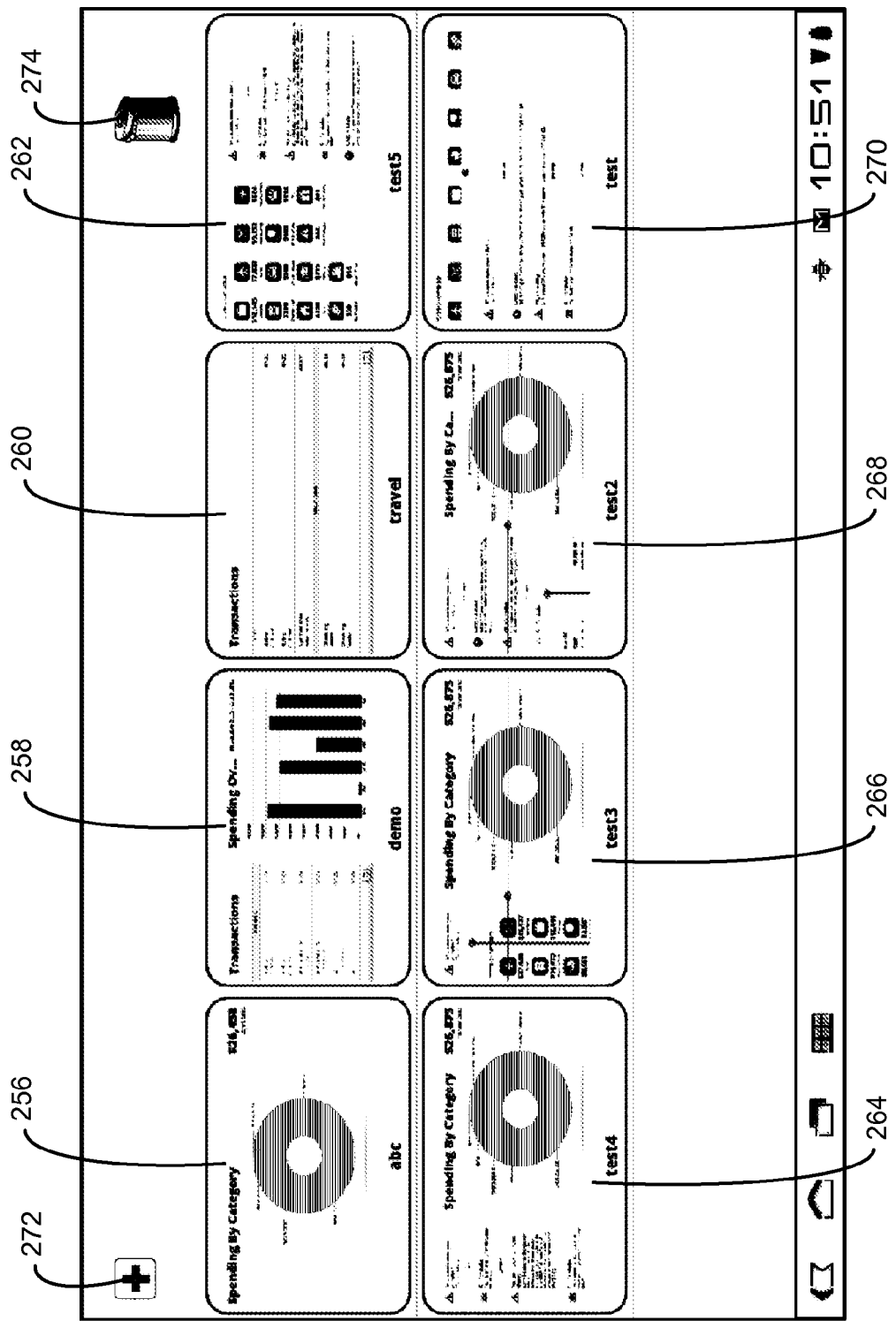
FIG. 2C shows an exemplary screenshot in accordance with the disclosed embodiments.

The user interface may also provide mechanisms for managing the use of custom views in the native application. As shown in FIG. 2C, the user interface may include a screen that displays a set and/or list of custom views 256-270 to the user. The screen of FIG. 2C may be provided by a management apparatus of a customization framework for the native application, such as management apparatus 108 of FIG. 1.

The screen may allow the user to access custom views 256-270. For example, the user may access and/or interact with a custom view by tapping and/or selecting the thumbnail representing the custom view within the screen. Once the user is shown the custom view, the user may navigate to other custom views in the list by swiping between consecutive custom views in the set and/or list. The user may also reorder the list so that the custom views are accessed in a different order. For example, the user may specify a "flow" of custom views 256-270 by dragging custom views 256-270 around the screen so that the flow begins with the custom view (e.g., custom view 256) on the top left corner of the screen and ends with the custom view (e.g., custom view 270) on the bottom right corner of the screen.

Finally, the screen may provide an element 272 that enables the creation of a new custom view and an element 274 that enables the deletion of an existing custom view. For example, the user may tap and/or select element 272 to create a custom view using the screen of FIG. 2A. Alternatively, the user may drag one or more custom views 256-270 to element 274 to delete the custom views from the native application.

Figure 3:
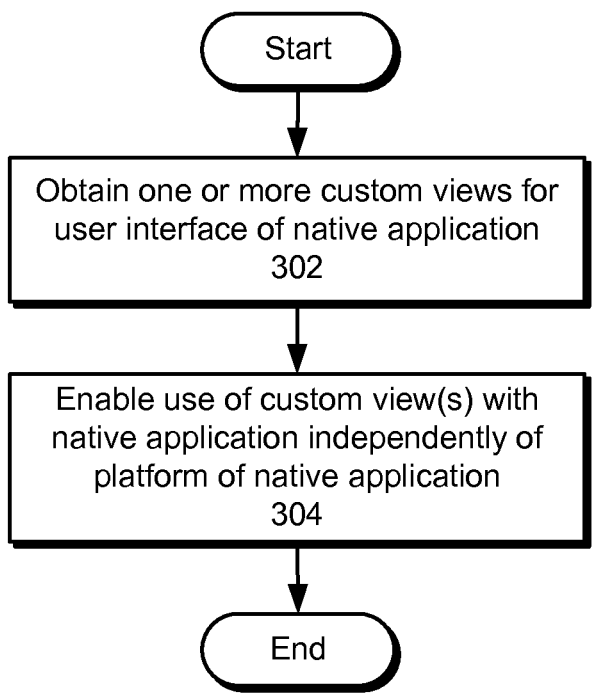
FIG. 3 shows a flowchart illustrating the process of facilitating use of a native application for a portable electronic device in accordance with the disclosed embodiments.

FIG. 3 shows a flowchart illustrating the process of facilitating use of a native application for a portable electronic device in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the embodiments.

Initially, one or more custom views for a user interface of the native application are obtained (operation 302). The custom view(s) may be obtained by enabling creation of the custom view(s) by a user, as discussed in further detail below with respect to FIG. 4. For example, the custom view(s) may be obtained from a user and/or developer of the native application. Conversely, the custom view(s) may be selected for use with the native application based on a use case of the native application. For example, the custom view(s) may be selected as a subset of custom views available for the native application that are configured for use with a certain type of user and/or "flavor" (e.g., basic, deluxe, premium, etc.) of the native application.

Next, use of the custom view(s) with the native application is enabled independently of the platform of the native application (operation 304). In particular, the custom view(s) may be displayed within the user interface, allowing changes to be made to the user interface without updating the native application and/or installing a new version of the native application. In addition, management of the custom view(s) may be enabled. For example, management of the custom view(s) may be associated with creation of new custom views, modification or deletion of existing custom views, and/or reordering of a list of the custom view(s).

Figure 4:
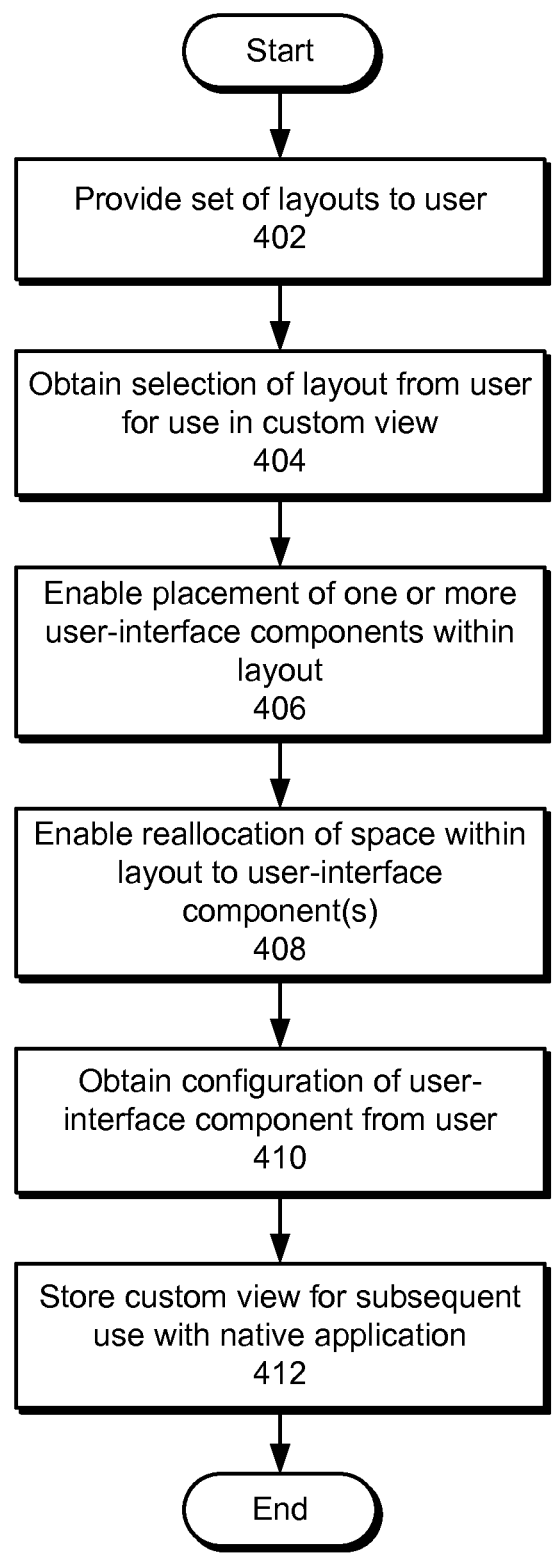
FIG. 4 shows a flowchart illustrating the process of enabling creation of a custom view by a user in accordance with the disclosed embodiments.

FIG. 4 shows a flowchart illustrating the process of enabling creation of a custom view by a user in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

First, a set of layouts is provided to the user (operation 402). The layouts may be displayed within a user interface for creating the custom view. In addition, the displayed layouts may be associated with a type of the portable electronic device (e.g., mobile phone, tablet computer, portable media player, etc.) to be used with the native application. For example, the displayed layouts may be tailored to the dimensions, orientation, and/or form factor of the portable electronic device.

Next, a selection of a layout from the set of layouts is obtained from the user for use in the custom view (operation 404). For example, the user may select the layout within the user interface by tapping, clicking, and/or highlighting the layout within the displayed set of layouts.

Placement of one or more user-interface components within the layout is then enabled (operation 406). For example, a list of available user-interface components may be displayed to the user, and the user may place a user-interface component within a predefined region in the layout by dragging the user-interface component from the list to the region. Reallocation of space within the layout to the placed user-interface components is also enabled (operation 408). For example, the user may resize the regions within the layout by dragging a set of rulers overlaid on the regions.

A configuration of a user-interface component may be obtained from the user (operation 410). For example, the user may specify a title, category, range, tag, value, display setting, and/or another parameter associated with the user-interface component to change the appearance and/or behavior of the user-interface component within the custom view.

Finally, the custom view is stored for subsequent use with the native application (operation 412). The custom view may be stored on the portable electronic device and/or a remote storage system. For example, the custom view may be created by a user of the native application and stored on the portable electronic device of the user to allow the user to customize interaction with the native application on the portable electronic device. Conversely, the custom view may be created by a developer of the native application and stored on cloud storage for subsequent use with specific use cases of the native application on a set of portable electronic devices. As a result, the custom view may allow the user to modify the user interface of the native application independently of the platform and/or implementation of the native application.

Figure 5:
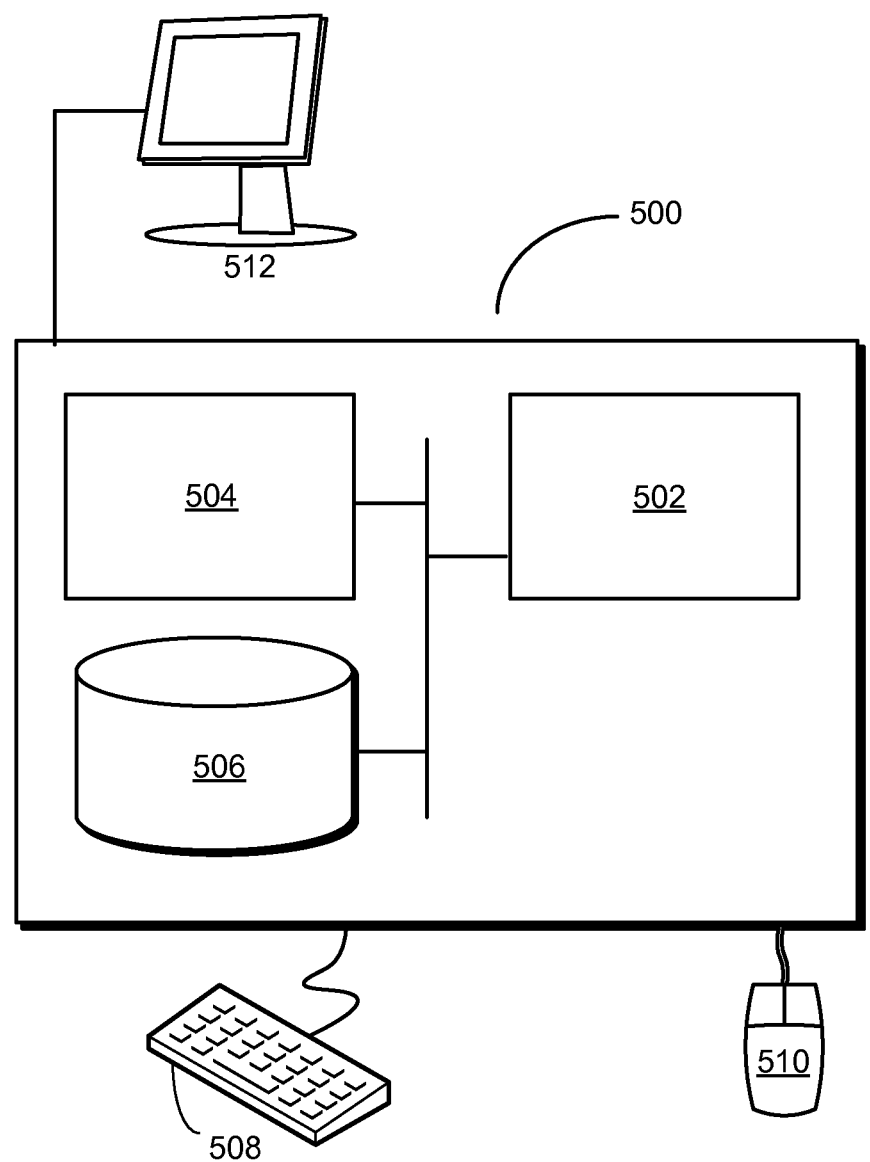
FIG. 5 shows a computer system in accordance with the disclosed embodiments.

FIG. 5 shows a computer system 500 in accordance with an embodiment. Computer system 500 may correspond to an apparatus that includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In one or more embodiments, computer system 500 provides a system for facilitating use of a native application for a portable electronic device. The system may include a configuration apparatus that obtains one or more custom views for a user interface of the native application. The custom view(s) may include a set of user-interface components, a layout of the user-interface components, and/or a configuration of a user-interface component from the set of user-interface components. To obtain the custom view(s), the configuration apparatus may enable creation of the custom view(s) by a user and/or select the custom view(s) for use with the native application based on a use case of the native application. The system may also include a rendering apparatus that displays the one or more custom views within the user interface independently of a platform of the native application. Finally, the system may include a management apparatus that enables management of the one or more custom views. For example, the management apparatus may enable the creation of a new custom view, the deletion of an existing custom view, and/or the reordering of a list of the custom view(s).

In addition, one or more components of computer system 500 may be remotely located and connected to the other components over a network. Portions of the present embodiments (e.g., configuration apparatus, rendering apparatus, management apparatus, etc.) may also be located on different nodes of a distributed system that implements the embodiments. For example, the present embodiments may be implemented using a cloud computing system that provides custom views of the native application to a set of remote portable electronic devices on which the native application is installed.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for facilitating use of a native application for a portable electronic device, comprising:
   presenting a set of one or more layouts to a user, wherein each layout comprises an arrangement of screens or user-interface elements within screens;
   receiving, from the user, a selection of a layout from the set of one or more layouts for use in a custom view;

creating the custom view, wherein the custom view specifies a configuration for one or more native user-interface components of the native application within a user-interface corresponding to the custom view and wherein the creating comprises receiving, from the user, a placement of one or more of the native user-interface components within the selected layout;

selecting the created custom view for use as a user-interface with the native application;

storing the created custom view for subsequent use with the native application; and enabling use of the created custom view with the native application independently of a platform of the native application, wherein the native application uses the created custom view to render the native user-interface components within the user-interface corresponding to the custom view.

2. The computer-implemented method of claim 1, wherein creating the custom view further involves at least one of:
   enabling reallocation of space within the layout to one or more of the native user-interface components; and
   obtaining the configuration of at least one native user-interface component from the user.

3. The computer-implemented method of claim 2, wherein the configuration of the user-interface component comprises at least one of:
   a title;
   a category;
   a range;
   a tag;
   a value; and
   a display setting.

4. The computer-implemented method of claim 1, wherein the custom view is stored in at least one of:
   the portable electronic device; and
   a remote storage system.

5. The computer-implemented method of claim 1, wherein the set of layouts is associated with a type of the portable electronic device.

6. The computer-implemented method of claim 1, wherein enabling use of the created custom view with the native application involves at least one of:
   displaying one or more custom views within a view-management user-interface; and
   enabling management of the one or more custom views.

7. The computer-implemented method of claim 6, wherein management of the created custom view is associated with at least one of:
   creation of a new custom view;
   modification of an existing custom view;
   deletion of the existing custom view; and
   reordering of a list of the one or more custom views.

8. A system for facilitating use of a native application for a portable electronic device, comprising:
   a memory;
   a processor;
   a presentation apparatus configured to present a set of one or more layouts to a user, wherein each layout comprises an arrangement of screens or user-interface elements within screens;
   a receiving apparatus configured to receive, from the user, a selection of a layout from the set of one or more layouts for use in a custom view;
   a creation apparatus configured to create a custom view, wherein the custom view specifies a configuration for one or more native user-interface components of the native application within a user-interface corresponding to the custom view and wherein the creating comprises receiving, from the user, a placement of one or more of the native user-interface components within the selected layout;
   a selection apparatus configured to select the created custom view for use as a user-interface with the native application;
   a storage apparatus configured to store the created custom view for subsequent use with the native application; and
   a rendering apparatus configured to display the native user-interface components of the created custom view within the user-interface corresponding to the custom view independently of a platform of the native application.

9. The system of claim 8, further comprising:
   a management apparatus configured to enable management of the created custom view.

10. The system of claim 9, wherein management of the created custom view is associated with at least one of:
    creation of a new custom view;
    modification of an existing custom view;
    deletion of the existing custom view; and
    reordering of a list of the one or more custom views.

11. The system of claim 8, wherein creating the custom view further involves at least one of:
    enabling reallocation of space within the layout to one or more of the native user-interface components; and
    obtaining the configuration of at least one native user-interface component from the user.

12. The system of claim 11, wherein the configuration of the user-interface component comprises at least one of:
    a title;
    a category;
    a range;
    a tag;
    a value; and
    a display setting.

13. The system of claim 8, wherein the custom view is stored in at least one of:
    the portable electronic device; and
    a remote storage system.

14. The system of claim 8, wherein the set of layouts is associated with a type of the portable electronic device.

15. A computer-readable storage medium storing instructions that when executed by a computer cause the computer to perform a method for facilitating use of a native application for a portable electronic device, the method comprising:
    presenting a set of one or more layouts to a user, wherein each layout comprises an arrangement of screens or user-interface elements within screens;
    receiving, from the user, a selection of a layout from the set of one or more layouts for use in a custom view;
    creating the custom view, wherein the custom view specifies a configuration for one or more native user-interface components of the native application within a user-interface corresponding to the custom view and wherein the creating comprises receiving, from the user, a placement of one or more of the native user-interface components within the selected layout, wherein the native application uses the created custom view to render the native user-interface components within the user-interface corresponding to the custom view.

16. The computer-readable storage medium of claim 15, wherein creating the custom view further involves at least one of:
    enabling reallocation of space within the layout to one or more of the native user-interface components; and obtaining the configuration of at least one native user-interface component from the user.

17. The computer-readable storage medium of claim 16, wherein the configuration of the user-interface component comprises at least one of:
- a title;
- a category;
- a range;
- a tag;
- a value; and
- a display setting.

18. The computer-readable storage medium of claim 15, wherein the custom view is stored in at least one of:
- the portable electronic device; and
- a remote storage system.

19. The computer-readable storage medium of claim 15, wherein the set of layouts is associated with a type of the portable electronic device.

20. The computer-readable storage medium of claim 15, wherein enabling use of the created custom view with the native application involves at least one of:
- displaying one or more custom views within a view-management user-interface; and
- enabling management of the one or more custom views.

21. The computer-readable storage medium of claim 20, wherein management of the created custom view is associated with at least one of:
- creation of a new custom view;
- modification of an existing custom view;
- deletion of the existing custom view; and
- reordering of a list of the one or more custom views.

* * * * *